(12) United States Patent
Dutta

(10) Patent No.: US 12,132,562 B2
(45) Date of Patent: Oct. 29, 2024

(54) LOW EARTH ORBIT (LEO) SATELLITE COMMUNICATION METHODS AND SYSTEMS USING FRACTIONATED SATELLITES AND HIGH-RESOLUTION SPATIAL MULTIPLEXING

(71) Applicant: Santanu Dutta, Vienna, VA (US)

(72) Inventor: Santanu Dutta, Vienna, VA (US)

(*) Notice: Subject to any disclaimer, the term of this patent is extended or adjusted under 35 U.S.C. 154(b) by 0 days.

(21) Appl. No.: 18/445,636

(22) Filed: Dec. 1, 2023

(65) Prior Publication Data

US 2024/0137109 A1 Apr. 25, 2024

Related U.S. Application Data

(62) Division of application No. 17/300,542, filed on Aug. 10, 2021, now Pat. No. 11,894,911.

(60) Provisional application No. 63/103,586, filed on Aug. 13, 2020.

(51) Int. Cl.
*H04B 7/185* (2006.01)

(52) U.S. Cl.
CPC ..... *H04B 7/18515* (2013.01); *H04B 7/18513* (2013.01)

(58) Field of Classification Search
None
See application file for complete search history.

(56) References Cited

U.S. PATENT DOCUMENTS

| | | | |
|---|---|---|---|
| 2009/0023383 A1* | 1/2009 | Mesecher | H01Q 3/30 455/3.02 |
| 2019/0082481 A1* | 3/2019 | Ravishankar | H04W 76/10 |
| 2019/0238216 A1* | 8/2019 | Avellan | H04B 7/18534 |
| 2019/0245590 A1* | 8/2019 | Singh | H01Q 3/2611 |

\* cited by examiner

*Primary Examiner* — Shripal K Khajuria

(57) ABSTRACT

Methods and systems for low earth orbit satellite communications, utilizing fractionated satellites and constellations with large baselines. The latter, combined with spatial multiplexing protocols, provides access to user equipment on the ground with much greater spatial resolution than hitherto possible. Methods include overcoming the problem posed by the round-trip delay of satellite links when adaptive, downlink, beamforming is attempted in Frequency Division Duplex (FDD) systems. Methods include using of uplink and downlink pilot signals which eliminate the need for controlling the physical integrity of the fractionated satellite through an electromechanical servo-control system in space.

2 Claims, 15 Drawing Sheets

LOW EARTH ORBIT (LEO) SATELLITE COMMUNICATION METHODS AND SYSTEMS USING FRACTIONATED SATELLITES AND HIGH-RESOLUTION SPATIAL MULTIPLEXING

CROSS REFERENCE TO RELATED PATENT APPLICATION

This application is a divisional of application Ser. No. 17/300,542, filed Aug. 10, 2021, which claims the benefit of U.S. Provisional Application No. 63/103,586, filed Aug. 13, 2020, which are hereby incorporated herein by reference in their entirety.

FIELD

The present disclosure is directed to methods and systems for LEO satellite communications, particularly methods and systems utilizing fractionated satellites and constellations with large baselines.

BACKGROUND

There is a resurgence of interest and investment in Low Earth Orbit (LEO) satellites, especially very small satellites weighing 10 kgs to 500 kgs, variously categorized as nanosatellite to small satellite. Several reasons have been attributed to this phenomenon. These include: low manufacturing and launch costs; the ability of present technologies to deliver traditional satellite functions in much smaller sizes; and better ability to back up cellular networks due to the lower latencies of LEOs compared to Geosynchronous (GEO) satellites. Advances sparking interest in LEO satellite investment includes software designed radio (SDR) techniques, advances in radio frequency integrated circuits (RFICs), and new signal processing algorithms, particularly in the domain of Multiple Input Multiple Output (MIMO) signal processing.

Two notable emergent systems are Lynk and SpaceMobile, both pursuing similar business models but with different technical solutions. The commonality in the business models is to locate the cellular base station in the satellite, as seen by a mobile user device, referred to as user equipment (UE).

Satellite networks have been attempting to provide coverage backup for cellular networks for many decades, starting with the Thuraya and ACeS systems in the early 2000s. However, these attempts have not seen mainstream adoption. One model, pursued by Thuraya, was to put a satellite application specific integrated circuit (ASIC) in the handset; the other, pursued by ACeS, was to put special satellite software in the handset without requiring a hardware change. While the ACeS approach was less disruptive to the user equipment (UE) than Thuraya's, it still required support from UE chipset and handset vendors. This was a tall ask in a market where manufacturing scales run beyond hundreds of millions per year, and the bill of materials (BOM) cost is managed to a few cents.

SUMMARY

An embodiment is drawn to a system for communication including at least one fractionated satellite, the at least one fractionated satellite including a plurality of satellites. Each of the plurality of satellites includes an antenna; a relative orbit location and an absolute pointing direction. The antennas of the plurality of satellites form a phased array antenna. The phased array antenna is configured to establish uplink and downlink communication links with user equipment on a surface of the earth using synthesized uplink and downlink antenna patterns, and nulls of the synthesized uplink and down link patterns are placed on undesired co-frequency user equipment.

Another embodiment is drawn to a system of communication comprising at least one fractionated satellite, the fractionated satellite comprising a main satellite and a plurality of ancillary satellites. The main satellite and the plurality of ancillary satellites communicate with user equipment on a surface of the earth with uplink and downlink communication links having communication frequencies in the range of 0.1 to 40 GHz, and distances between the satellites exceed several tens of wavelengths of the communication wavelengths associated with the communication frequencies.

Another embodiment is drawn to a method of communication using a fractionated satellite comprising a main satellite and a plurality of ancillary satellites. The method includes sending communications from the main satellite through a satellite feederlink antenna to a gateway on the ground. The gateway comprises a gateway feederlink antenna. Gain patterns on the satellite feederlink antenna and the gateway feederlink antenna have peak gains that are mutually, substantially aligned and the alignment tracks the movement of the fractionated satellite in its orbit up to a threshold elevation angle.

DETAILED DESCRIPTION

Like its predecessors, the latest ventures of Lynk and SpaceMobile also aim to provide coverage backup for cellular networks but avoid disrupting the UE ecosystem by not touching the UE in any way. They aim to work with standard handsets requiring no change in either the hardware or software of the UE. Both systems put the cellular base stations in space, which gives them much greater geographic coverage than a terrestrial base station. Thanks to software changes in the base stations, the UEs cannot tell that the base stations are approximately 500 km, not 1 km, away.

Two main challenges are created by locating the cellular base station on a LEO satellite orbiting approximately 500 km from Earth with a control point speed on the ground of approximately 7 km/s. These challenges include (i) Timing Advance (TA) for the UE, and (ii) compensation of satellite induced large Doppler shifts due to the high velocity of the satellite. The problem of Timing Advance exists because the return links of many cellular protocols are based on Time Division Multiple Access (TDMA). This means that UEs sharing the same frequency must not overlap in time, that is, they should use distinct return link time slots of the TDMA frame. Lynk addressed this problem, while using the GSM protocol, by allowing UEs to have an uncertainty in the Time of Arrival (ToA) at the satellite that spans multiple return link time slots. This requires return link time slots to be left unused. While this approach avoids changes in the UE software, it costs loss of return link capacity, as time slots are the carriers of capacity in a TDMA system.

Figure 1:
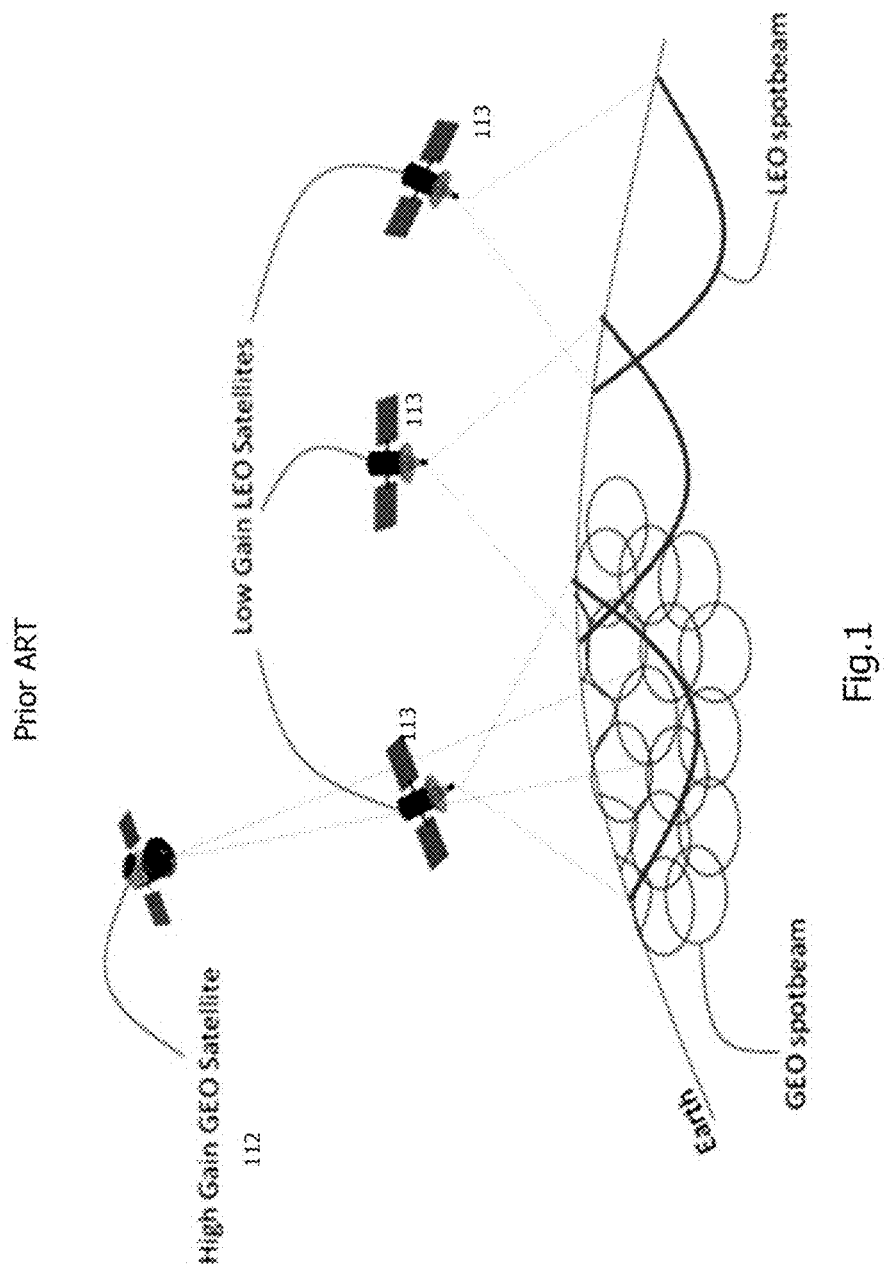
FIG. 1 is a schematic view illustrating beams created by prior art high gain, large GEO and low gain small LEO satellites.

FIG. 1 illustrates two cases, i.e., the use of a high gain GEO satellite 112 and the use of low gain LEO satellites 113. One of the disadvantages of using small LEO satellites 113 relative to large GEO satellites 112 is that small satellite antennas necessarily have low gains. This is true even though the small LEO satellites 113 are closer to the Earth and therefore able to close radio links with less transmit power leading to greater link capacity. Their small physical sizes prevent them from supporting large antennas, which are used to create large antenna gains. For example, a GEO satellite 112 with a 20 m plus antenna aperture may have a peak antenna gain in excess of 45 dBi at L-band. In contrast, the theoretical gain of an L-band antenna with a 1 m diameter and 50% efficiency would be approximately 21 dBi at the same frequency. The beams that can be formed on the Earth with a 21 dBi antenna at 500 km altitude would be large compared to those which can be formed with a 45 dBi antenna at the geosynchronous altitude of 36,000 km. Approximate, typical values are 500 km radius for the low gain LEO satellite 113 and 150 km radius for the high gain GEO satellite 112 in the above example.

Figure 2:
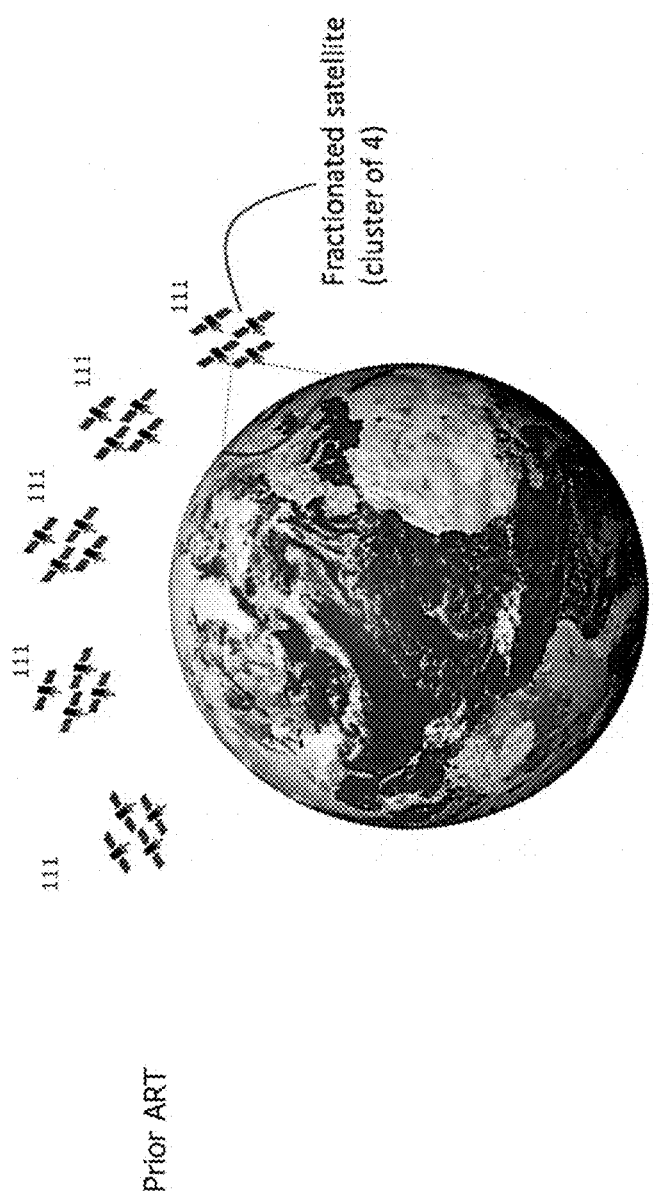
FIG. 2 is a schematic view illustrating a prior art system having a cluster of small satellites also known as a fractionated satellite.

SpaceMobile [e.g., U.S. Pat. No. 9,973,266] differentiates itself from Lynk by addressing the low-antenna-gain limitation of a single, small satellite 112 by deploying a cluster 111 of small satellites, referred to as "fractionated satellite", as illustrated in FIG. 2. One of the functions that may be shared among the plurality of satellites in the cluster 111 is beamforming. The advantage of multi-satellite beamforming is that the effective aperture of the fractionated satellite can approximate an aperture projected towards the Earth by the entire satellite cluster 111. This is usually much more cost effective than building and launching an equivalent-aperture, single monolithic satellite 112 or 113. The conventional approach in deploying fractionated satellites has been to make the cluster 111 mimic a monolithic satellite 112 or 113. This has been attempted in the past with the help of a servo-control system, employing electromechanical components such as magnetotorquers, to keep the relative locations and attitudes of the individual satellites within strict limits. The embodiment methods and systems described herein eliminate the need for an electromechanical servo-control system in space.

Figure 3:
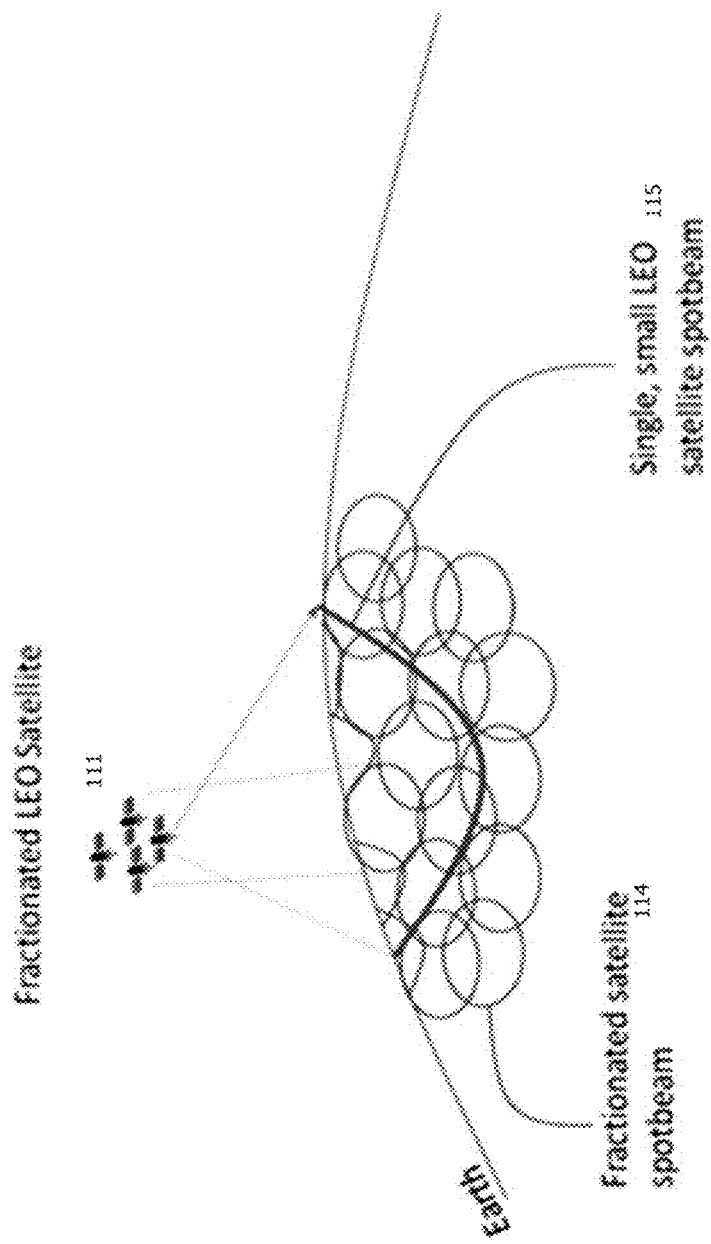
FIG. 3 is a schematic view illustrating prior art spot beams formed by fractionated and monolithic LEO small satellites.

FIG. 3 illustrates spot beams 114, 115 formed by fractionated, satellite cluster 111, and a monolithic LEO small satellite, respectively. As can be seen in FIG. 3, the monolithic LEO small satellite 113 forms a single, relatively large spot beam 115. In contrast, the fractionated satellite forms a plurality of relatively much smaller spotbeams 114. Because of this, the fractionated satellite 111 provides a much greater capacity density on the ground though frequency reuse, similar to cellular network.

Despite the ability to form smaller spotbeams than single satellites like Lynk, a deficiency of conventional beamforming systems such as SpaceMobile is that, although they do increase the antenna aperture relative to a single satellite, the increased aperture is used to form classical, i.e. cell based, beams, wherein the satellite's power is focused on a location rather than a user. These radio access methods are suboptimal for accessing densely clustered users on the ground. Embodiments herein teach new methods of antenna pattern synthesis which, for a given satellite aperture, can create far greater access resolution on the ground than classical beams. For a non-uniform distribution of users on the ground, this leads to substantially greater network capacity.

Advantages of embodiment methods and systems over conventional systems and methods are now described:
Very Large Baseline Adaptive Array.

Present embodiment methods and systems use a much larger than usual baseline in the phased array antenna of the fractionated satellite than in conventional systems and methods. In phased array antenna literature, "usual baseline" refers to half wavelength which, at 800 MHz (an example operating frequency), is 0.38 m. The baseline refers to the distance between two elements in the phased array. In some embodiments, the array elements may be approximately 100 m to 1 km apart, that is, 266 to 2666 wavelengths apart. There are no known examples of adaptive antenna arrays utilizing such large baselines. In some conventional systems, the maximum separation mentioned is 20 m. Very large baselines may introduce their own problems, especially when the phased array platform (the fractionated satellite) is moving at high speed relative to the UEs being served. Embodiments herein teach how to mitigate these problems.
Adaptive Antenna Array Pattern Synthesis Using Pilot Signals.

Various embodiments herein use pilot signals in the uplink and downlink to guide antenna pattern synthesis of the composite (fractionated) satellite in a closed loop manner without requiring knowledge of the orbit locations of the satellites or their attitudes. Thus, embodiments eliminate the servo-control system used by conventional fractionated satellites. As described above, conventional the beamforming is open loop, which creates challenging requirements for maintaining physical integrity of the composite, phased array antenna. While some conventional systems disclose pilot signal guided adaptive antenna beamforming, they do not deal with very large baseline arrays and do not disclose mitigation of the signal processing problems created by high speed satellite motion.

Beam-Free Spatial Multiplexing Of UEs.

Figure 4:
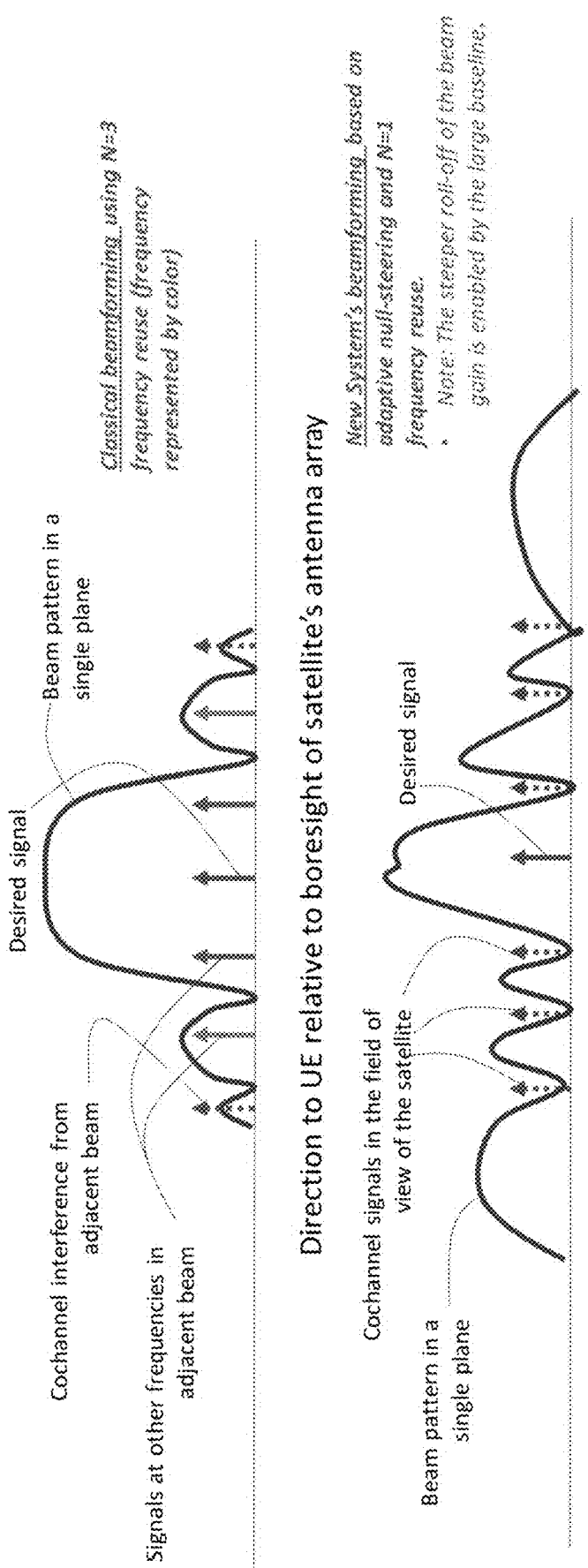
FIG. 4 is a plot comparing beamforming of embodiment systems and conventional systems.

In the present disclosure, the term, "beam" is sometimes used (as shorthand) to refer to antenna patterns synthesized by embodiment of the system and/or methods. It should be understood that these so-called beams are phased array antenna patterns optimized to steer nulls towards undesired users and other interference sources, while also maintaining sufficient gain towards a desired user so as to ensure that the received signal to noise and interference ratio (SNIR) is above an objective threshold value. Unlike traditional beamforming, the objective is not to maximize gain over a contiguous geographic area. Instead of forming traditional beams to isolate the links from the satellite cluster to co-frequency UEs, as SpaceComm does, embodiment systems and methods place nulls of the synthesized pattern of the phased array antenna on undesired co-frequency UEs while maintaining a minimum gain towards desired users, as described above. Only the desired UE is assigned a non-zero pattern gain. This concept is illustrated in FIG. 4. For reference, classical beamforming is shown in the top trace, which shows the beam pattern, represented as antenna gain in a single plane. The lower trace shows the antenna pattern synthesized by embodiment systems and methods. Classical beamforming can form non-interfering, or orthogonal, radio links to cochannel UEs by virtue of frequency reuse and adjacent beam isolation. However, the spatial distance required to achieve adequate isolation is usually large, e.g. at least a spacing of two beam diameters is required for a frequency reuse of N=3. In contrast, embodiments of the systems and methods, using more effective spatial signal processing that can form orthogonal access to cochannel UEs that are much closer, e.g. a few hundred meters at a frequency of 800 MHz and an example inter-satellite separation of 100 m. It should be understood that these examples are for illustration only, and apply to many other embodiments beyond those cited.

The following discussion further clarifies how the present invention operates relative to the prior art. In classical beamforming, at separations close to the main beam, such as the immediately adjacent beam, it is typically necessary to use additional frequencies to create isolation. The number of frequencies used is referred to as the Reuse Factor, sometimes designated by N. In satellite applications, values of N between 3 and 7 are common. In contrast, embodiments of the system and methods herein operate by placing the peak (or at least a non-zero-gain point of the pattern) on the desired signal and a null (low point of the pattern) on every other cochannel UE. This effectively allows a N=1 frequency reuse throughout the coverage area of the fractionated satellites. It should be clear from the above that, other factors remaining identical, embodiments of the systems and methods have K-times the spectral efficiency of the classically beamformed system, where K is the number of satellites in the cluster and the spacing between the satellites is at least half-wavelength. This follows from the fact that an adaptive phased array antenna with K satellites, spaced by more than half-wavelength, offers K−1 degrees of freedom to steer nulls.

DETAILED DESCRIPTION OF NEW EMBODIMENTS

System Architecture

Figure 5:
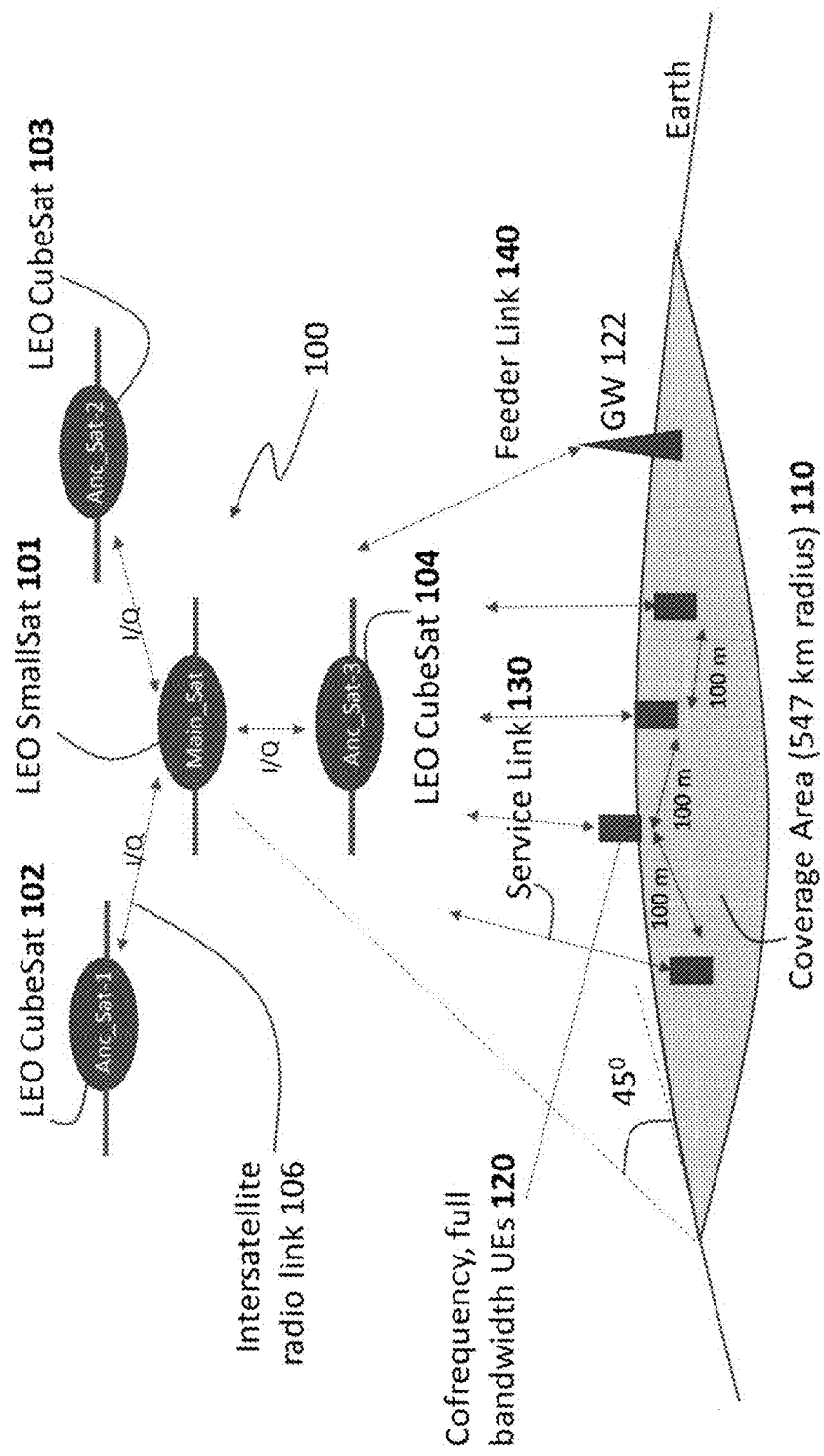
FIG. 5 is a schematic view illustrating the architecture of an embodiment system.

FIG. 5 illustrates a high-level architecture 100 of an embodiment system. The embodiment system comprises a main satellite Main_Sat 101 which may be a small LEO satellite. Main satellite Main_Sat 101 may be surrounded by a cluster of ancillary small satellites Anc_Sat-1 102, Anc_Sat-2 103 and Anc_Sat-3 104. As illustrated, the cluster has three ancillary small satellites Anc_Sat-1 102, Anc_Sat-2 103 and Anc_Sat-3 104. However, any number of ancillary small satellites may be provided, such as but not limited to 4, 5, 6, 7, 8 or more ancillary small satellites Anc_Sat-1 102, Anc_Sat-2 103 and Anc_Sat-3 104.

In some embodiments, the ancillary satellites Anc_Sat-1 102, Anc_Sat-2 103 and Anc_Sat-3 104 may be substantially smaller and less complex than the main satellite Main_Sat 101, for example belonging to CubeSat or NanoSat categories. Size and cost reduction of the ancillary satellites Anc_Sat-1 102, Anc_Sat-2 103 and Anc_Sat-3 104 may be enabled by allocating the majority of the processing functions—digital and RF—to the main satellite Main_Sat 101. This may include digital beamforming for all satellites (main and ancillary), all base station general processing functions (e.g. protocol stack processing and, in some embodiments, selected core network functions), and gateway access functions. This reduces the roles of the ancillary satellites Anc_Sat-1 102, Anc_Sat-2 103 and Anc_Sat-3 104 to those of remote antennas and transceivers with a modicum of digital processing.

The cluster 111 of satellites comprising the fractionated satellite may occupy a three-dimensional polyhedron in space. The larger the volume of the polyhedron, the greater is the spatial resolution with which UEs can be accessed, because a larger polyhedron creates a larger effective aperture projected towards the Earth. In addition to a large aperture facing the Earth, it may be desirable that the polyhedron have a substantial component in the radial direction to Earth, i.e. not resemble a flat disc. This is because such a distribution of antennas is better able to resolve potential grating lobes that may occur when the baseline is large relative to half wavelength.

In various embodiments, the satellites may carry relatively small, low gain antennas, thereby minimizing both manufacturing and launch costs. It is not necessary that the antenna gains be identical in all satellites. In some embodiments, Main_Sat 101 may have a higher gain antenna than the ancillary satellites Anc_Sat-1 102, Anc_Sat-2 103 and Anc_Sat-3 104, thereby enabling smaller beams than may be otherwise possible with the ancillary satellites Anc_Sat-1 102, Anc_Sat-2 103 and Anc_Sat-3 104. A higher gain antenna on the main satellite Main_Sat 101 may be useful in tracking gateway stations 122 on the ground, as described below. In the example embodiment shown in FIG. 5, a single spotbeam, corresponding to the lowest antenna gain among the individual satellites of the cluster, may cover the entire targeted coverage area 110. The coverage area 110 is usually chosen to be an area on the surface of the Earth from where the elevation angel subtended to the center of the cluster 111 is at least, approximately 45 degrees, as shown in FIG. 5. This minimum elevation angle is usually chosen so that typical blockages are cleared in most environments except, perhaps, dense urban.

The cluster 111 of satellites, comprising the fractionated satellite, move in a chosen orbit around the Earth. Many different orbits are known for LEDs, including circular, elliptical, polar, and others. The specific orbit is not dispositive to the embodiments of the systems and methods herein—the teachings are applicable to all LEO constellations. As the cluster 111 moves over the face of the Earth, UEs, upon exiting a coverage area, are handed over between different clusters 111, or fractionated satellites, using conventional techniques.

It is not necessary for the satellite separations within the fractionated satellite (cluster 111) to be identical, or be held over time within narrow limits. There is no theoretical limit to how close two UEs with orthogonal links can be; however, practical considerations may limit the distance to approximately 100 m. This UE separation example is illustrated in FIG. 5. There is also no requirement about the exact patterns of the individual antennas, beyond the requirement that the individual antennas should have reasonable gains in the directions of interest, i.e. in all directions corresponding to the coverage area 110.

Signal flows among the satellites, and between the satellites and Earth based entities, is described below.

For the service downlink, the complex signals to be transmitted by all satellites, main Main_Sat 101 and ancillary Anc_Sat-1 102, Anc_Sat-2 103 and Anc_Sat-3 104, are created by Main_Sat 101. The complex baseband (I/Q) signal for each ancillary satellite Anc_Sat-1 102, Anc_Sat-2 103 and Anc_Sat-3 104 may be communicated to that satellite by the main satellite Main_Sat 101, together with a global position system (GPS) time stamp (GPST), over an intersatellite radio link 106. The stamped time indicates the scheduled time of downlink transmission, selected by a Scheduler in the main satellite. Techniques for intersatellite communication are known and are not discussed here. The downlink signals may be transmitted by all satellites at the scheduled GPST indicated in the time stamp. This process ensures that signals transmitted from all satellite antennas are time synchronized.

For the service uplink, the signal flow is reversed relative to the downlink. Uplink signals received by the individual satellites (ancillary Anc_Sat-1 102, Anc_Sat-2 103 and Anc_Sat-3 104 and main Main_Sat 101) may be downconverted to complex baseband and sent to the main satellite Main_Sat 101 for processing. If the signal was received by an ancillary satellite Anc_Sat-1 102, Anc_Sat-2 103 and Anc_Sat-3 104, the signal is sent from the ancillary satellite Anc_Sat-1 102, Anc_Sat-2 103 and Anc_Sat-3 104 to the main satellite Main_Sat 101 over an intersatellite link 106. The signal packets may be accompanied with a GPS time stamp, indicating the time of arrival of the packet at the receiving satellite antenna. At the main satellite Main_Sat 101, the signals received from the ancillary satellites Anc_Sat-1 102, Anc_Sat-2 103 and Anc_Sat-3 104 and the main satellite Main_Sat 101 may be time and frequency aligned and subjected to synthetic beamforming according to chosen algorithms described below.

Figure 6:
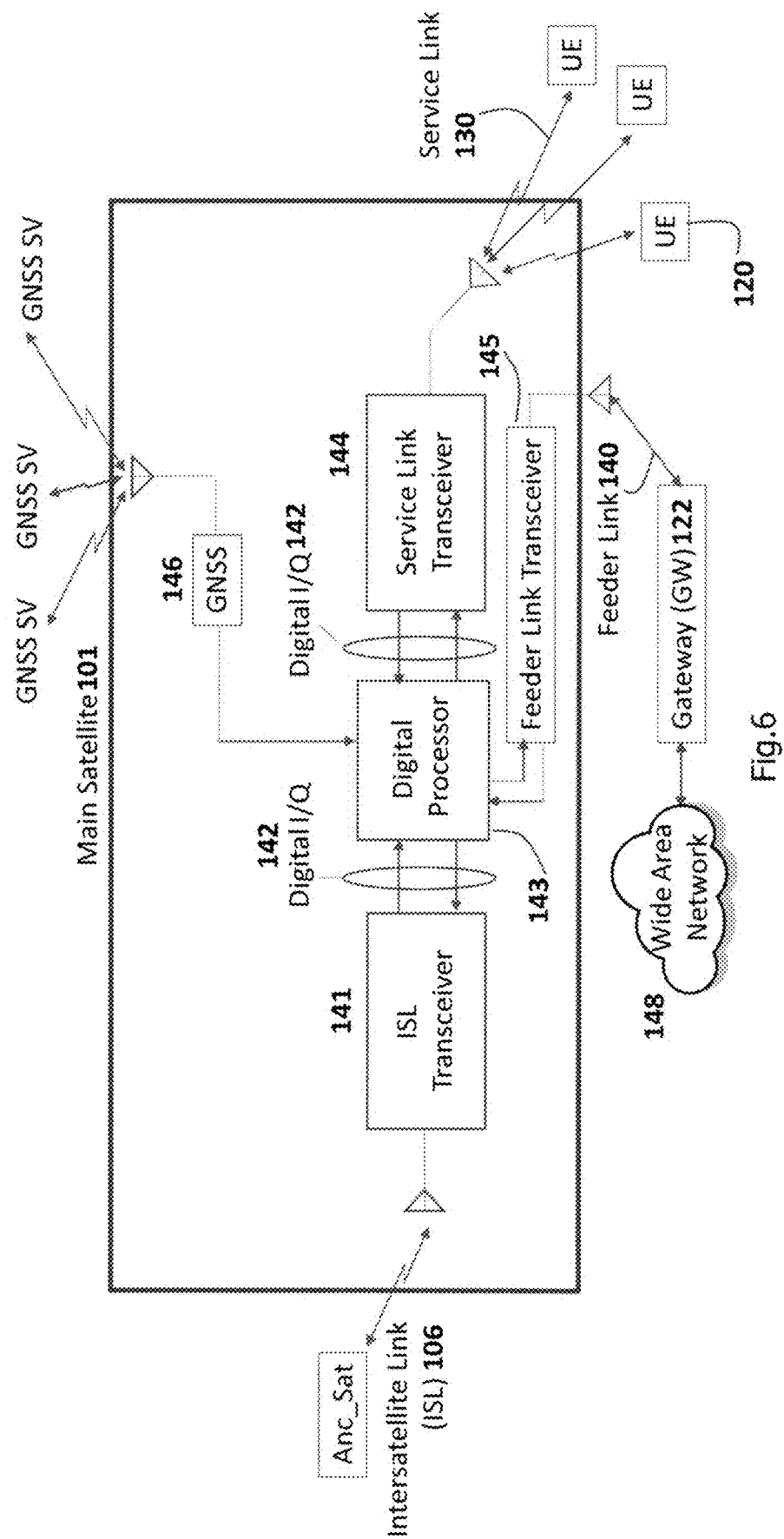
FIG. 6 is a block diagram illustrating the architecture of a main satellite of an embodiment system.
Figure 7:
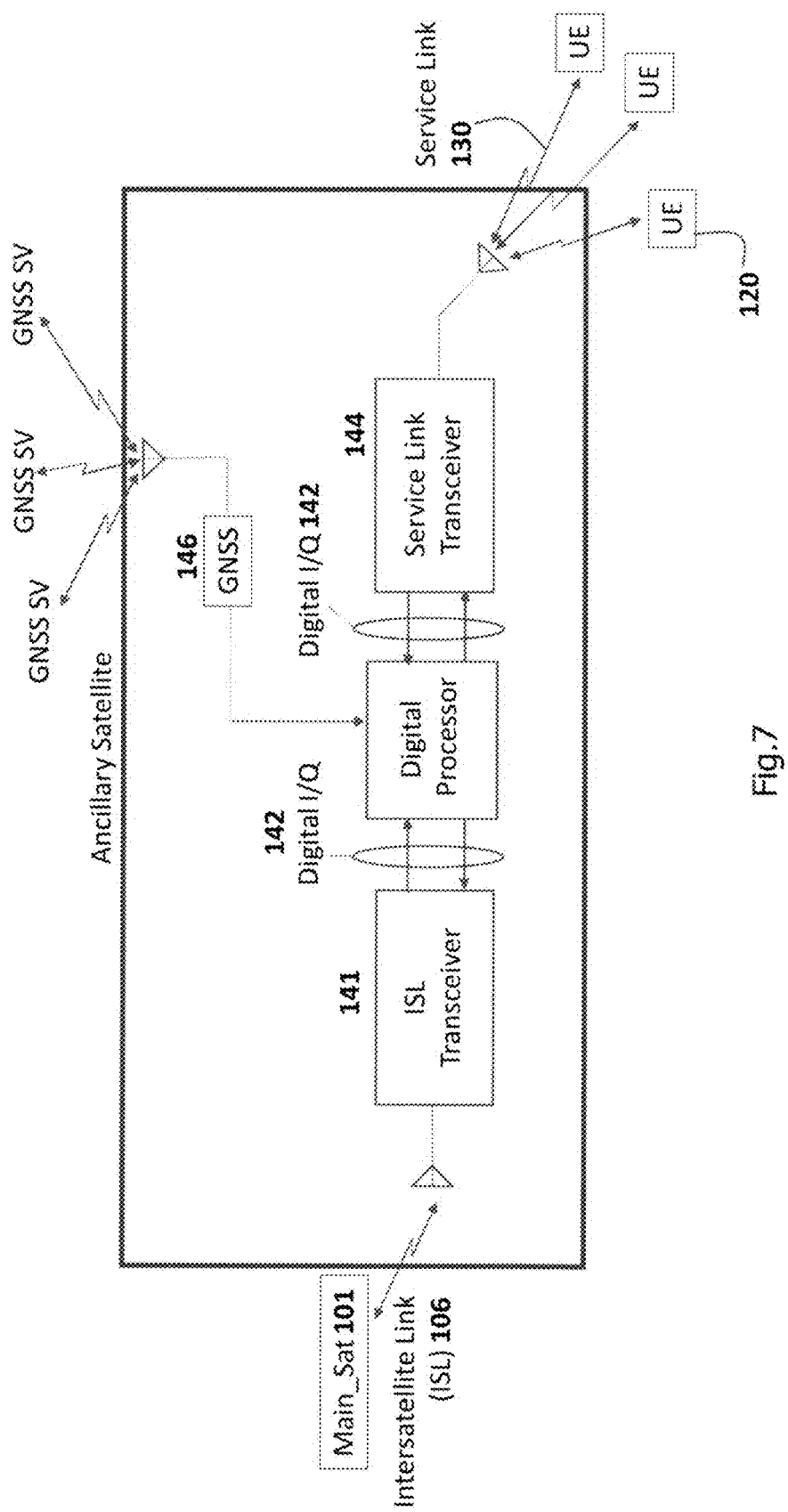
FIG. 7 is a block diagram illustrating the architecture of an ancillary satellite of an embodiment system.

Block diagrams of the processing performed at the main Main_Sat 101 and ancillary satellites Anc_Sat-1 102, Anc_Sat-2 103 and Anc_Sat-3 104 are shown in FIGS. 6 and 7, respectively.

Main Satellite Main_Sat 101

The architecture of the main satellite Main_Sat 101 is described at a high level in FIG. 6. Where the subsystems can be implemented based on conventional technologies known in the prior art, detailed descriptions are omitted. The main satellite, Main_Sat 101, supports the following radio links: intersatellite link (ISL) 106 to a plurality of ancillary satellites, Anc_Sats 102, 103, 104; service link 130 to UEs 120; feeder link 140 to Gateway (GW) 122. In various embodiments, the main satellite Main_Sat 101 performs the following functions in the indicated subsystems:

Digital Processor

The following are the example functions of the Digital Processor of the main satellite.

Uplink and downlink beamforming for each satellite, including itself. The beamforming is a part of the physical (PHY) layer of the service link protocol.

Execution of the full, service link protocol stack, up to the interface with the application layer.

Execution of the full, feeder link protocol stack. The feeder link connects the main satellite to one or more terrestrial, wide area networks through a plurality of gateways (GWs) 122 on the Earth. Use of space-based gateways, hosted on other satellites, is also possible but is optional.

Radio resource allocation through an intelligent Scheduler function. This function is similar to those found in Earth-based, cellular base station subsystems' RAN Schedulers.

Execution of interface protocols to the core network. This is similar to those found in Earth-based, cellular base station subsystems' core network interface. In some embodiments, the entire core network may be part of the GW, in which case the core network interface is implemented over the feeder link. In other embodiments, some core network functions, such as the service gateway (S-GW) in LTE networks, may be performed in the main satellite Main_Sat 101. The partitioning of the core network between implementation in the main satellite Main_Sat 101 and in the GW 122 is optional.

Applying time stamps to message packets sent to the ancillary satellites Anc_Sat-1 102, Anc_Sat-2 103 and Anc_Sat-3 104, and consuming time stamps applied to message packets received from the ancillary satellites Anc_Sat-1 102, Anc_Sat-2 103 and Anc_Sat-3 104 and by the main satellite's Main_Sat 101 own antenna/transceiver subsystem. A purpose of the time stamps is to ensure synchronization between signals transmitted and received by all satellites. In various embodiments, the time stamps may be based on GPS Time (GPST) information provided by the Global Navigation Satellite System (GNSS) subsystem 146 carried on all satellites (main and ancillary). Other time stamp systems may also be used.

Beamforming for the feeder link antenna. The beamforming may be fixed or adaptively track the gateway location, as further discussed below.

ISL Transceiver 141

The inter-satellite link (ISL) transceiver 141 may be any low-latency radio link. A desired parameter is that the processing latency on the link (additional to transmission latency) should be known within certain limits, which will be accounted for in the forward link transmit time scheduling. The ISL Transceiver 141 translates complex baseband (digital I/Q) signals 142 from the Digital Processor 143 to bandpass RF, and vice versa, using any suitable technology, including software designed radio (SDR), which offers the advantages of lower cost and size compared to earlier technologies. The bandpass RF signals may be delivered to the antenna (Anc_Sat) via ISL 106.

Service Link Transceiver 144

Like the ISL Transceiver 141, the Service Link Transceiver 144 frequency translates complex baseband (digital I/Q) signals 142 from the Digital Processor 146 to RF and vice versa, the RF signals being transported to a plurality of UEs 120 over service link 130. Any suitable radio technology may be used to implement the Service Link Transceiver 144, including software defined radio. The access protocol used on the Service Link 130 may correspond to any cellular standard, such as an LTE or 5G, which supports downlink and uplink pilot signals for beamforming. Proprietary, i.e. non-standard, protocols may also be used provided they support the above mentioned pilot signals.

Feeder Link Transceiver 145

The feeder link 140 connects the main satellite 101 to a gateway (GW) station 122 on the Earth. The feeder link 140 may share spectrum with the service link or use a separate, dedicated band. The feeder link 140 corresponds to the backhaul link in cellular networks. Use of a dedicated feeder link offers the advantage of greater capacity in the service link 144.

A purpose of the gateway is to provide connectivity to terrestrial wide area networks 148 such as the Internet or Mobile Network Operators' core networks. From a networkwide cost perspective, it is desirable to minimize the geographic density of GWs. Therefore, it is desirable that each gateway be able to track multiple satellite clusters. For this, it is advantageous to have a phased array antenna at the gateway that can simultaneously track multiple satellite clusters 111. This may be realized by synthesizing L parallel beams, where L is the number of satellite clusters 111. As a satellite cluster 111 moves in its orbit, each beam tracks the satellite cluster 111 with the peak of its radiation pattern, while pointing nulls towards the other satellite clusters 111. Thereby, each beam provides spatially multiplexed access to each satellite cluster 111, both in the downlink and the uplink. Note, that for the feeder link, the GW 122 needs to link only with the main satellite 101, not the ancillary satellites Anc_Sat-1, Anc_Sat-2 or Anc_Sat-3.

If the size of the main satellite 101 permits, a gateway-tracking phased array antenna may be used. The mutual tracking of the main satellite Main_Sat 101 and the gateway antenna may be open loop or closed loop. In open loop tracking, the beam steering is performed independently at the gateway 122 and the main satellite Main_Sat 101, based on known locations of the gateway 122 and the main satellite Main_Sat 101. In closed loop beamforming, beacon signals are transmitted by the main satellite Main_Sat 101 and the gateway 122, which aid the beamforming signal processing elements in Main_Sat 101 and GW 122 by enabling recognition and tracking of each other's pilot signals. This enables optimal alignment of the uplink and downlink beams to maximize the signal to noise and interference ratio (SNIR) in the receivers at both ends of the link. This system will be more robust than open loop beamforming as it is not based on a priori information about satellite's location, which may be subject to errors.

Figure 8:
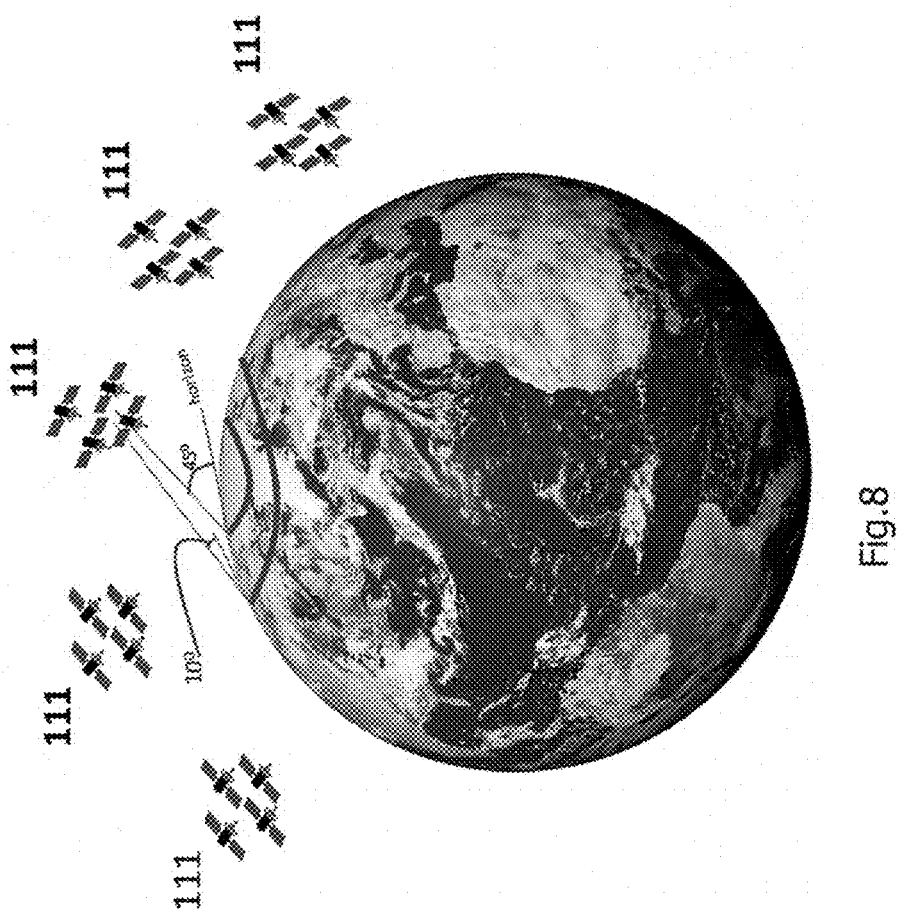
FIG. 8 is a schematic view illustrating beam coverages for service links and feeder links according to an embodiment.

It is advantageous to use a tall tower at the gateway to clear environmental blockages and reduce the minimum elevation angle to the satellite to a much lower value, such as 5-15 degrees, such as 10 degrees, compared to the 40-50 degrees, such as 45 degrees recommended for the service link. The greater coverage afforded by a tall tower, supporting satellite visibility down to low elevation angles, is illustrated in FIG. 8. When tall towers are used, multiple fractionated satellites may be tracked by a single gateway.

Ancillary Satellites Anc_Sat-1 102, Anc_Sat-2 103 and Anc_Sat-3 104

The ancillary satellite architecture is described at a high level in FIG. 7. Where the subsystems can be implemented by conventional methods, detailed descriptions are omitted. As the architectures of the main Main_Sat 101 and ancillary satellites Anc_Sat-1 102, Anc_Sat-2 103 and Anc_Sat-3 104 are similar, only the differences between the two are explained below.

Digital Processor 143

Below is a discussion of several functions of the Digital Processor 143 of the ancillary satellite Anc_Sat-1, Anc_Sat-2, Anc_Sat-3.

In various embodiments, all beam-weight calculations and the creation of service link signals are performed by the main satellite Main_Sat 101. Except for providing and consuming time stamps as described above, the ancillary satellites Anc_Sat-1 102, Anc_Sat-2 103 and Anc_Sat-3 104 act as pass-through channels for service link signals that are developed wholly in the main satellite Main_Sat 101, for both the downlinks and uplinks. The above complexity reduction enables cost and size reduction of the ancillary satellites Anc_Sat-1 102, Anc_Sat-2 103 and Anc_Sat-3 104. As the ancillary satellites Anc_Sat-1, Anc_Sat-2, Anc_Sat-3 are more numerous than the main satellite Main_Sat 101, the beneficial impact on the system cost of the above partitioning may be substantial. Note in some conventional systems, it is usual to distribute the processing load approximately equally among all satellites in the cluster 111, or fractionated satellite.

In the service downlink, as described above, complex-baseband service link signals may be transmitted by the main satellite Main_Sat 101 and received by the ancillary satellite Anc_Sat-1 102, Anc_Sat-2 103 and Anc_Sat-3 104. The signals may be sent as discrete packets of digital I/Q data on the ISL 106, together with a time stamp corresponding to a scheduled transmit time of the packet by the satellite. The scheduling may be performed by the main satellite, using knowledge of the maximum transit time in the ISL 106, the processing time required by the ancillary satellites Anc_Sat-1, Anc_Sat-2, Anc_Sat-3, and allowing for some margin. Note that this delay does not need to be known exactly as the transmissions may be synchronized to GPST regardless of the net delay.

In the uplink, complex-baseband values of the signal received from the Service Link Transceiver 144 may be arranged in packets and time stamped by the ancillary satellite Anc_Sat-1 102, Anc_Sat-2 103 and Anc_Sat-3 104 with the GPST corresponding to the time of arrival of the packet as the satellite antenna. The main satellite's Digital Processor 143 processes the signals received from all satellites, including itself, after time aligning them based on the above time stamps.

Gateway

Figure 9:
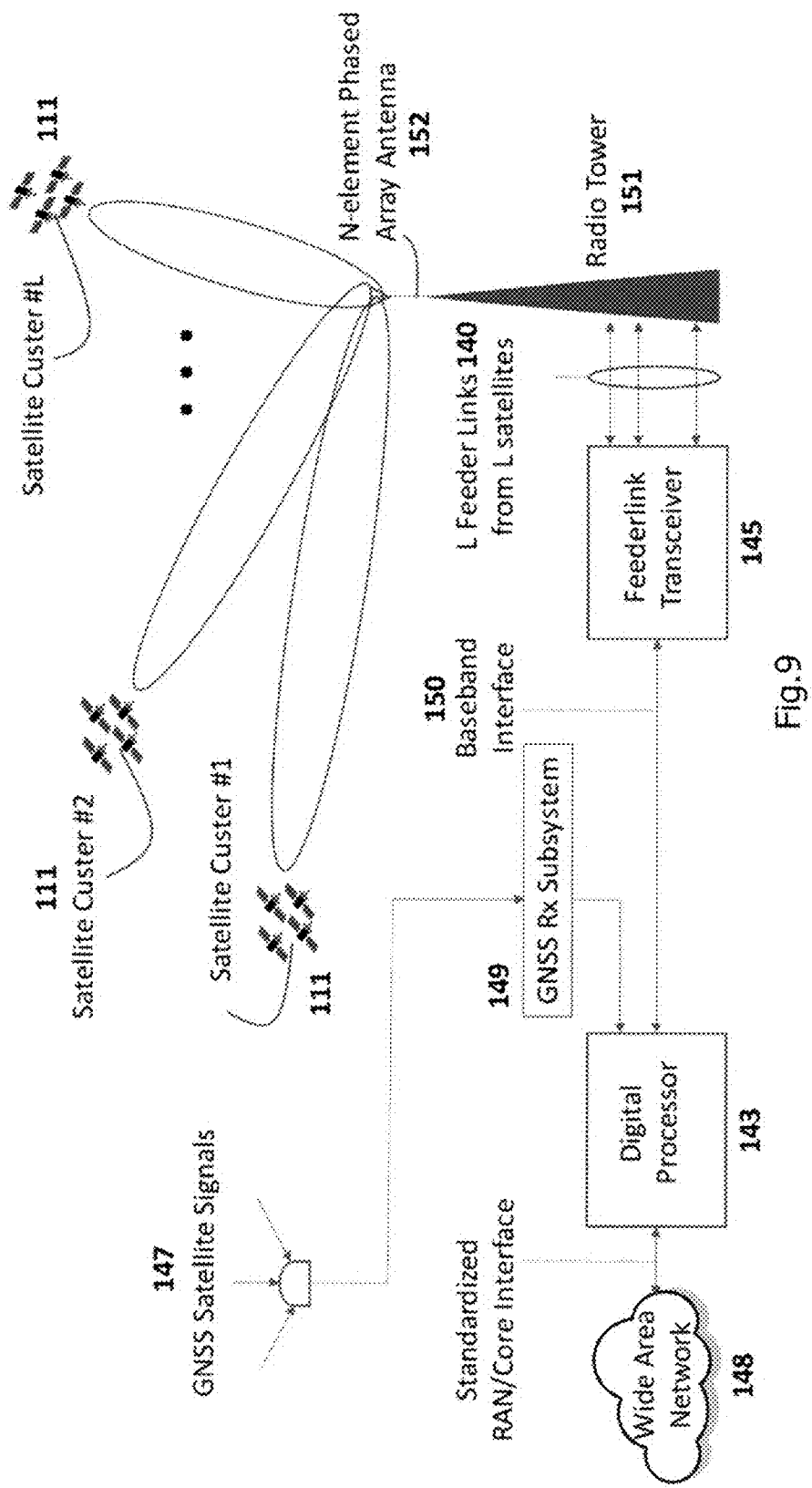
FIG. 9 is a schematic view illustrating a gateway architecture according to an embodiment.

FIG. 9 illustrates the Gateway (GW) 122 architecture at a high level. Specifically, FIG. 9 illustrates the functional role of the GW 122 in the network. The antenna 152 may be mounted on a tower 151, or other suitable platform, that is preferably as high as possible to maximize coverage. Using a phased array antenna 152 and digital beamforming, the gateway antenna's 152 pattern could be designed to track multiple, say L, main satellites Main_Sat 101 in L fractionated satellites. A method to track each individual satellite cluster 101 is described above. FIG. 9 shows a gateway antenna 152 simultaneously tracking L satellite clusters 111, or fractionated satellites.

In some embodiments, the feederlinks 140 from L main satellites Main_Sat 101 (where L satellite clusters 111 are visible to the gateway 122) may be on the same frequency, with isolation between feederlinks 140 dependent on beam pattern based spatial multiplexing. This approach conserves spectrum. In other embodiments, the L feederlinks 140 may use distinct frequency bands or polarization, which minimizes interference between the feederlinks 140 without the complexity of spatial multiplexing but consumes more spectrum. In some embodiments, spatial multiplexing and frequency/polarization diversity may be combined to maximize feederlink isolation.

In the return link direction (UE 120-to-base station), the L feeder links 140 received from the antenna subsystem 149 of the GW 120 may be frequency translated by the Feeder Link Transceiver 145 to complex baseband and passed to the Digital Processor 143 via a baseband interface 150. There, the signals may be demodulated, together with spatial filtering to implement the tracking antenna beams. The software to implement the feeder link protocol may be executed in the Digital Processor 143. Note that the feeder link protocol does not need to conform to any cellular standard as it does not affect the UE 120. The output from the Digital Processor 143 may comprise digital data at the user and the control planes. These data may be then transmitted to their destinations over a conventional Wide Area Network (WAN) 148 such as the Internet. In the embodiment where the space-based base stations are backing up a Mobile Network Operator's (MNO's) cellular network, the WAN could connect to the MNO's core network. In such embodiments, the WAN-facing interface of the Digital Processor 143 may conform to the MNO's RAN/Core interface standard.

In the forward link direction (base station-to-UE 120), user plane and control plane data from the MNOs' core network will be received by the GW's Digital Processor 143, which may create L service link data streams for transport to the L satellite clusters 111. This includes GW forward link beamforming and frequency translation to the appropriate forward feederlink frequency. As for the return link case, a single frequency may be used for all satellite clusters 111, where isolation between the clusters 111 may be achieved by beam shape and spatial multiplexing; in alternative embodiments, L distinct frequencies, or a combination of frequencies and polarizations may be used, which could provide greater isolation. In some embodiments, beam-based spatial multiplexing and frequency/polarization diversity may be combined to maximize isolation between the links to different satellite clusters 111.

In some embodiments, the GW Digital Processor 143 may implement some core network functions. This may be appropriate if the GW 122 is architected to provide access to multiple satellite clusters 111, each of which is a proxy cellular base station. This is because the GW 122 fills the roles of a Mobility Management Entity (MME) and Service Gateway (S-GW) of an LTE Evolved Packet Core (EPC) network.

The GW 122 may have a GNSS subsystem 149 which, in addition to providing timing synchronization, which is used by many cellular protocols, also may identify the location of the GW 122 and GPST, which may be used, together with knowledge of the locations of the satellite clusters, in open loop tracking of the L satellite clusters, as described above.

Service Link Beamforming
Return Link Beamforming

At the UE transmitter, the complex modulation envelope of UEj is sj(t), where the index j identifies the UE 120 and can take values between 1 and M. The signal sj(t) comprises the user information, Uj(t), plus an embedded pilot signal, dj(t), as follows.

$$sj(t)=Uj(t)+dj(t)$$

Where dj(t) is a unique waveform, or pilot signal, assigned to UEj and known systemwide. Uj(t) is the payload of the communication protocol for the service link, comprising user plane and control plane information. In the present description, for convenience, the pilot signal is shown separately from Uj(t) but in practice it would be part of the control plane information.

The signals received from the M UEs 120 at the N satellites can be represented as M column vectors, as shown below.

$$[X1(t)] = [x11(t), x12(t), \ldots x1N(t)]^T$$
$$[X2(t)] = [x21(t), x22(t), \ldots x2N(t)]^T$$
$$\vdots$$
$$[XM(t)] = [xM1(t), xM2(t), \ldots xMN(t)]^T$$

Where T represents transpose of the matrix.

As the signals from the M UEs 120 add linearly at the N satellites' antennas, we can represent the composite input (received) vector, [X(t)], as the sum of the vectors, [Xj(t)], j=1 to M.

$$[X(t)]=[X1(t)]+[X2(t)]+\ldots+[XM(t)] \quad (1)$$

Figure 10:
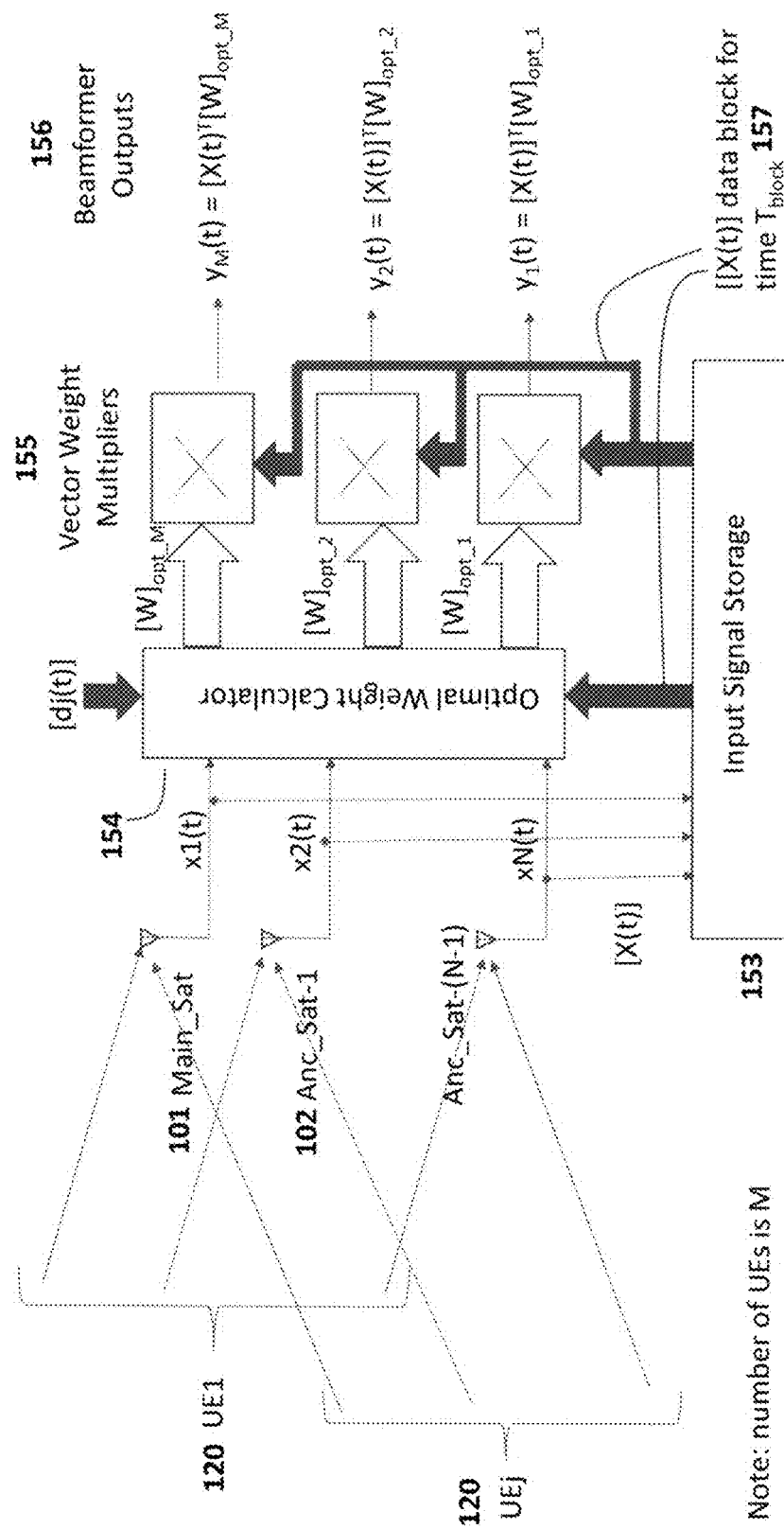
FIG. 10 is a block diagram illustrating a return link (UE to satellite) beamforming method according to an embodiment.

In various embodiments, the heart of the beamformer is the Optimal Weight Calculator 154, illustrated in FIG. 10. The Weight Calculator 154 processes blocks 157 of [X(t)] data and locally generated copies of the UE pilot signals, dj(t), according to an optimization algorithm described below to produce M complex weight vectors (vector weight multipliers 155), $[W]_{opt\_j}$ where j=1 to M. Each $[W]_{opt\_j}$ is optimal for a specific UEj. Then, a scalar output, yj(t), may be produced by forming the inner products of the vectors, [X(t)] and $[W]_{opt\_j}$. Here, a block 157 of [X(t)] samples, collected over time, Tblock, is processed to generate $[W]_{opt}$. It should be noted that the uplink received vectors, [Xj(t)], from different UEj arrive at the satellites at asynchronous times since the UEs are unsynchronized. The optimal weight is developed by processing uplink vectors received over time, Tblock, assuming that the vectors are stationary with respect to their directions of arrival during this time. A fixed optimal weight is applied to all uplink vectors received during Tblock. The next sample of the optimal weight will be applied to the next block 157 of [X(t)] data, received over the next Tblock seconds. In the literature, Tblock is referred to as "coherence time" or "coherence block", which is a configuration parameter for the system. The criteria for its selection are discussed below.

Blocks 157 of [X(t)] data are collected in the Input Signal Storage module 153 shown in FIG. 10. The beamformer outputs 156, yj(t) are developed by the following equation, $$y_j(t)=[X(t)]^T \cdot [W]_{opt\_j} \quad (2)$$

As mentioned above, $[W]_{opt}$ may be calculated once every $T_{block}$ seconds, where $T_{block}$ is the period of time over which $[R_{xx}]$ and $[R_{xd}]$ are averaged, as per equations (3) and (4) below. $[W]_{opt}$ is considered optimal, on average, for the entire time block but may change from one block of input data to the next.

As depicted in FIG. 10, there are M simultaneous beamforming and output generation operations, as the signals from M UEs 120 are processed simultaneously.

Various options are available for the optimization method, or algorithm. One popular algorithm is Minimum Mean Squared Error (MMSE), also referred to as the Wiener-Hopf optimization criterion. The algorithm entails implementing the following equations in real time software (typically using digital signal processing technology) in the Digital Processor for each UE 120. For clarity, the UE index, j, is dropped from equations (3)-(5) below.

$$[R_{xd}]= <[X(t)]^* \cdot d(t)> \quad (3)$$

Where <·> represents time average over time-block, $T_{block}$.

$$[R_{xx}] = <[X(t)^* \cdot X(t)^T]> \quad (4)$$

$$[W]_{opt} = [R_{xx}]^{-1} \cdot [R_{xd}] \quad (5)$$

The sequence of operations are as follows.

As per equation (3), the $[R_{xd}]$ vector, also referred to as the direction vector as it indicates the direction of the satellite relative to the UE 120, is formed by time averaging the complex conjugate of each xi(t), i=1 to N, and the locally generated pilot signal, d(t).

As per equation (4), the rectangular covariance matrix, $[R_{xx}]$ is formed by taking the outer product of [X(t)] with itself and time averaging every term in the matrix over time, $T_{block}$.

As per equation (5), the matrix, $[R_{xx}]$ is inverted and post-multiplied by $[R_{xd}]$ to yield the optimal weight, $[W]_{opt}$.

As per equation (2), the scalar output, y(t) is formed. Note that y(t) is time varying at the same signal-sampling rate as xi(t). It is simply a linearly weighted version [X(t)], weighted by a weight, [W]opt, which changes more slowly (every $T_{block}$ seconds). The choice of the block time, $T_{block}$, is optimized to minimize the variation of the direction vectors from the satellites to the UEs 120 and maximize the averaging of noise and non-pilot components in the reference signal, d(t). $T_{block}$ is referred to in the literature as coherence block as, during this time, the usage scenario is expected to remain effectively stationary. Here, effectively means, 'from the perspective of the desired performance objective'. Some factors that enter into the optimization of $T_{block}$ are discussed below. If the UE pilot signal, d(t), is uncorrelated with the additive noise at the receiver and non-reference-signal components in x(t), the cross-correlation of d(t) and x(t) may yield a larger value if $T_{block}$ is larger, and vice versa. Additional drivers for the choice of $T_{block}$ are the geometrical parameters of the usage scenario, such as distance between the satellites in a cluster (the baseline), height of the cluster about the Earth and the velocity of the control point relative to the Earth.

Forward Link Beamforming

In a Time Division Duplex (TDD) system, the forward link beamforming can substantially reuse the return link [W]opt, with some relatively minor additional processing to match the RF calibration of the base station's front end. This approach takes advantage of the well-established reciprocity of RF channels. However, in a Frequency Division Duplex (FDD) system, such reciprocity does not exist—the uplink and downlink channels are generally not predictable, scalar multiples of each other. Hence, the forward link channel state should be estimated by the UE, fed back to the base station, forward predicted in time, and then applied to forward link beamforming. The beamforming process involves taking the vector inner-product between [W]opt, which is based on predicted channel states at time, tp, with [X(tp)], which is the vector [X(t)] scheduled for transmission at time, tp.

Figure 12:
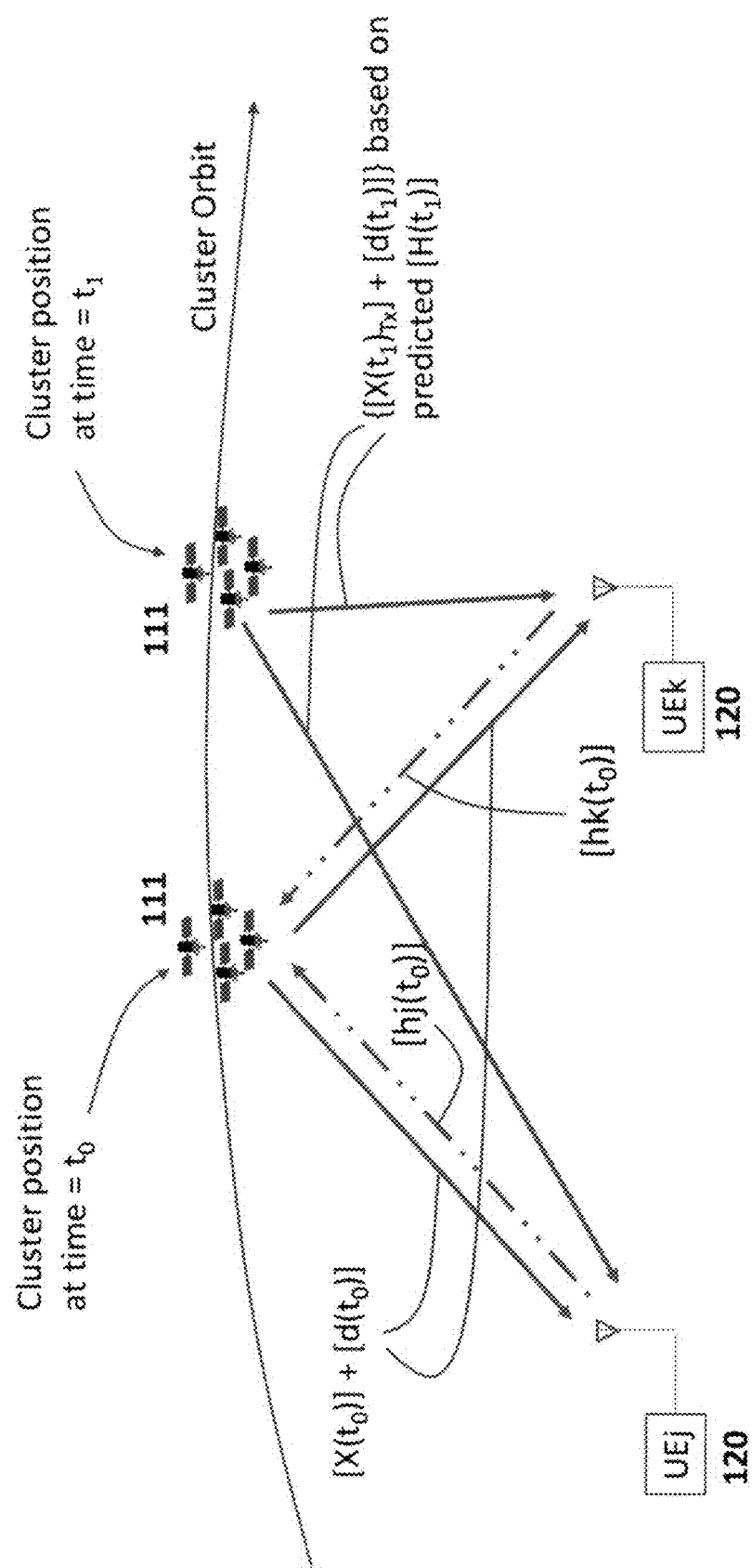
FIG. 12 is a schematic view illustrating forward link channel estimation by user equipment according to an embodiment.

In various embodiments, estimation of the forward link channel may be based on unique pilot signals transmitted by each satellite of the cluster 111. The channel estimate from each of the N satellites may be received synchronously and makes up an N-element channel state vector, [hj(t)]. It may be time stamped and tagged with its time-of-receipt, and fed back by the UE to the satellite cluster 111 using the return link. Relative to its use for downlink beamforming, the channel state vector will be late by at least the Earth-Space propagation time. This problem may be mitigated by forward prediction of the channel state vectors, based on knowledge of the satellites' orbits and velocities at a given time, as illustrated in FIG. 12. This approach entails that environmental multipath play a relatively small role in determining the channel state vector. In terrestrial networks, the channel state vector is characterized in the time domain by the impulse response of the channel, h(t), and it's Fourier Transform, H(ω), in the frequency domain. In terrestrial channels where multipath is dominant, the channel state has a relatively small correlation distance (spatial separation over which the channel state is correlated, hence predictable), which manifests as fast fading when the UE 120 is mobile. When multipath is non-dominant, as is typical in line-of-sight satellite links at elevation angles above 45 degrees, the channel states are well correlated up to relatively large separation distances. In such cases, H(ω) becomes a flat-fading, predictably geometry dependent, scalar quantity, making forward time prediction of the channel state, from a given location of the satellite to another proximate location, feasible. Leveraging this characteristic of satellite channels is a feature of various embodiments—channel state prediction from a priori knowledge of path geometry and the satellite cluster's velocity.

The following explains how the UE 120 assists in downlink channel state processing, illustrated by FIGS. 12-15. The satellite-specific pilot signals, di(t), i=1 to N, where N is the number of satellites in the cluster, are received by UEj and UEk. The di(t) are unique waveforms, such as PN codes. These may be correlated with local copies of the waveforms to determine the complex channel response.

Figure 13:
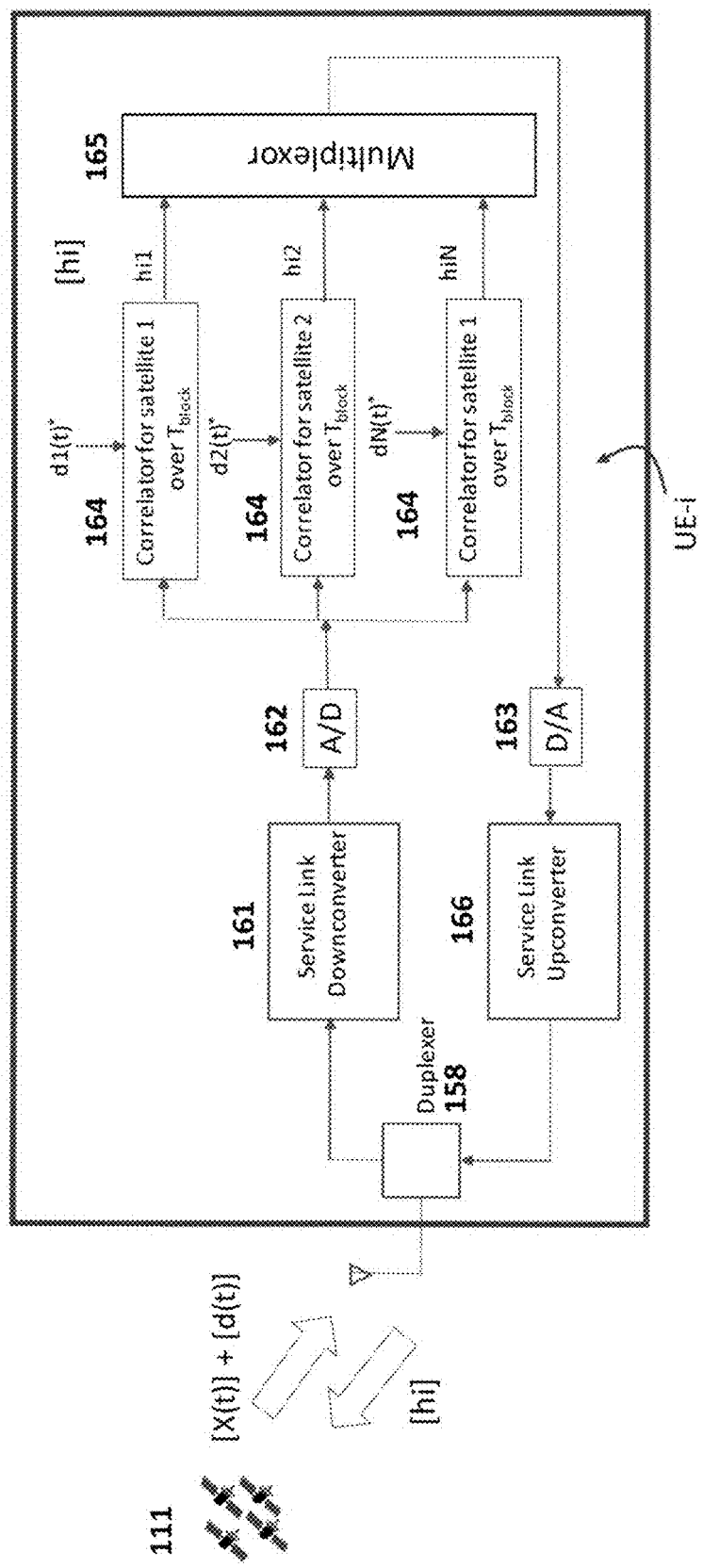
FIG. 13 is a schematic view illustrating forward link channel estimation processing by user equipment according to an embodiment.

FIG. 13 is a schematic illustration showing forward link channel estimation processing by user equipment (UE) 120 according to an embodiment. The UE includes a duplexer 158, Service Link Downconverters 161, Analog to Digital Converter 162, a Digital to Analog Converter 163, Service Link Upconverter 166, Correlator's 164 and a multiplex or 165.

Figure 14:
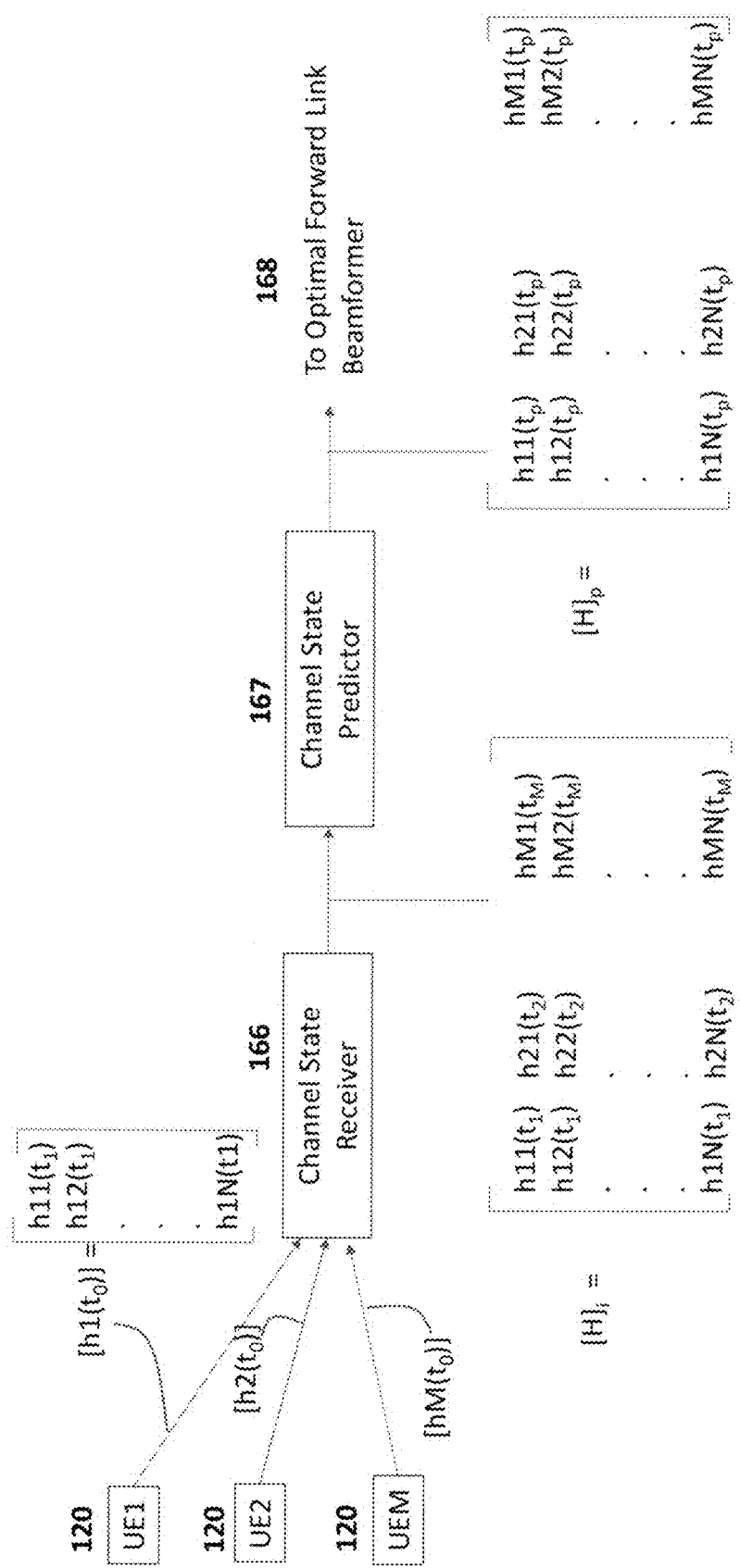
FIG. 14 is a schematic view illustrating forward link channel estimation processing by user a main satellite according to an embodiment.

FIG. 14 is a schematic illustrating showing forward link channel estimation processing by user a main satellite Main_Sat 101 according to an embodiment. The main satellite Main_Sat 101 includes a Channel State Receiver 166, a Channel State Predictor 167 and an Optimal Forward. Link Beamformer 168.

Figure 15:
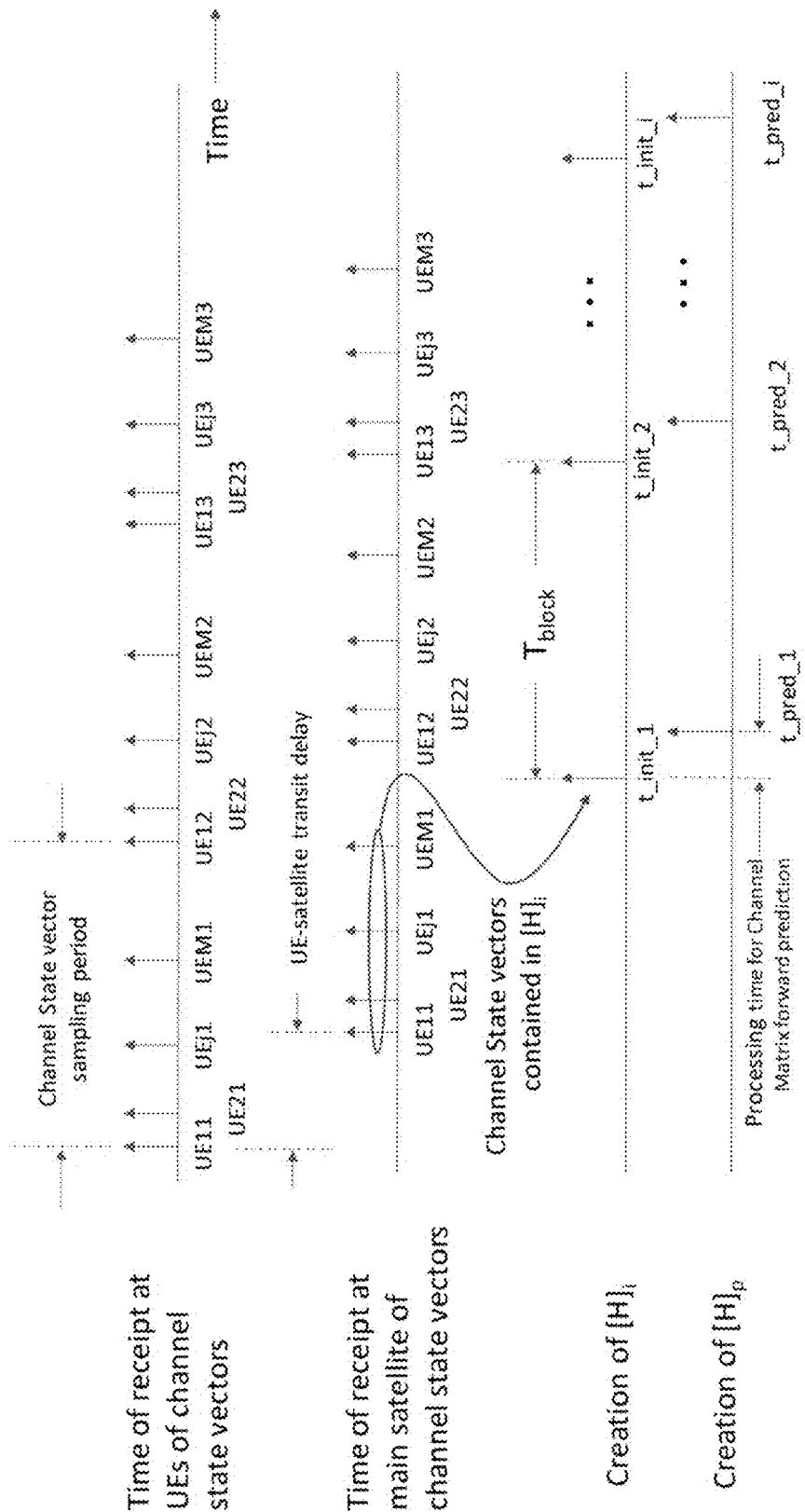
FIG. 15 is plot illustrating creation and prediction time lines showing forward link channel estimation.

A channel state vector, [hj(t$_0$)], where j is the UE index and t$_0$ is the time-of-receipt of the vector, is obtained for each satellite-to-UE link. The channel state estimates of all paths to all UEs comprise a N×M matrix, referred to as $[H]_i$, to represent the initial value of [H], as shown in FIG. 14. Note that each column of [H]i is the channel state vector received by a particular UE 120, say UEj, at a particular time, tj where j=1 to M. The $t_j$ are different because the channel state sampling times of the UEs 120 are unsynchronized and random. Thus, $[H]_i$, is a matrix of channel state vectors sampled at random times. This is illustrated in FIG. 15 where the sampling instants of each UE, e.g. U11, U12, U13 . . . are periodic but separated by a random interval from the sampling times, UE21, UE22, UE23 . . . of another UE 120. Thus, $[H]_i$, is a collection of channel state vectors whose sample times are periodic when referring to the same UE but random between different UEs 120.

The matrix $[H]_i$, would remain essentially stationary if the satellite cluster was stationary in its orbit. Unfortunately, the satellite cluster 111 moves on its planned orbit, changing the values of the channel state vectors as functions of time. As mentioned above, because of the determinism of the satellite motion (within error bounds), the channel state vectors can be forward predicted to a substantial extent. The time over which the prediction is made accommodates the Earth-Space propagation time plus a margin for onboard processing time on the satellite. The prediction is based on knowledge of the orbit location and velocity of the satellite cluster.

The forward prediction time line is illustrated in FIG. 15. All channel state vectors in the channel state matrix, $[H]_t$, (each column is the channel state vector from a particular UE 120) are forward predicted to the same time in the future, t_pred_i to form the predicted channel matrix, $[H]_p$. In this process, channel state vectors from the same UE 120 are processed together as they comprise a periodic time series input to a common transformation, or forward prediction, process. The channel state vectors from other UEs 120 may have independent transformation processes, fed by time series channel state vectors from the corresponding UEs 120. The initial channel state matrix, $[H]_I$ collects all the channel state vectors over a coherence block of time, $T_{block}$. In various embodiments, all channel state vectors are forward predicted to the same future time, t_pred, and make up the contents of $[H]_p$. Note that both t_init and t_pred from a periodic sequence with the period, $T_{block}$.

For convenience, the analytical method below assumes that the directions of the signals are reversed and equations (3) to (5) applied to determine $[W]_{opt}$. Specifically, the input vector, [X1(t)], is replaced by $[h1]_p$; [X2(t)] by $[h2]_p$; ... and [XM(t)] by $[hM]_p$. Here, unlike the [Xi(t)] vectors, the $[hi]_p$ are time-invariant over $T_{block}$. This is because $[hi]_p$ are developed by correlation (as per the equation below), which yields only one output per time block, $T_{block}$. The correlation is performed according to the following equation—the subscript "p" is dropped for clarity.

$$[hi] = <[X_{rx}(t)]di*> \quad (6)$$

Where $[X_{rx}(t)]$ is the "received version" (at the satellite cluster) of the transmitted vector (after reversing the direction of transmission).

Note that [hi] is the direction vector (indicated by the channel state vector) from the ith UE 120 to the satellite cluster 111.

Analogous to equation (1), composite matrix, [H], is formed as follows, as illustrated in FIG. 14.

$$[H] = [[h1], [h2], \ldots [hM]] \quad (7)$$

The above channel estimate matrix, [H], is delayed by the Earth-Space propagation delay plus any processing delay in the satellite. The following calculations are performed using the predicted values at time, t_pred, which, for clarity, is not shown explicitly in the arguments of the functions below.

The auto-covariance matrix is formed as, $$[R_{HH}] = [H]^* \cdot [H]^T \quad (8)$$

The optimal weight is formed as, $$[W]_{opt\_j} = [R_{HH}]^{-1}[hj]] \quad (9)$$

Note that the direction vector to UEj, i.e. [hj], is already known and does not have to be calculated in a separate step, as in equation (3) for the uplink.

Figure 11:
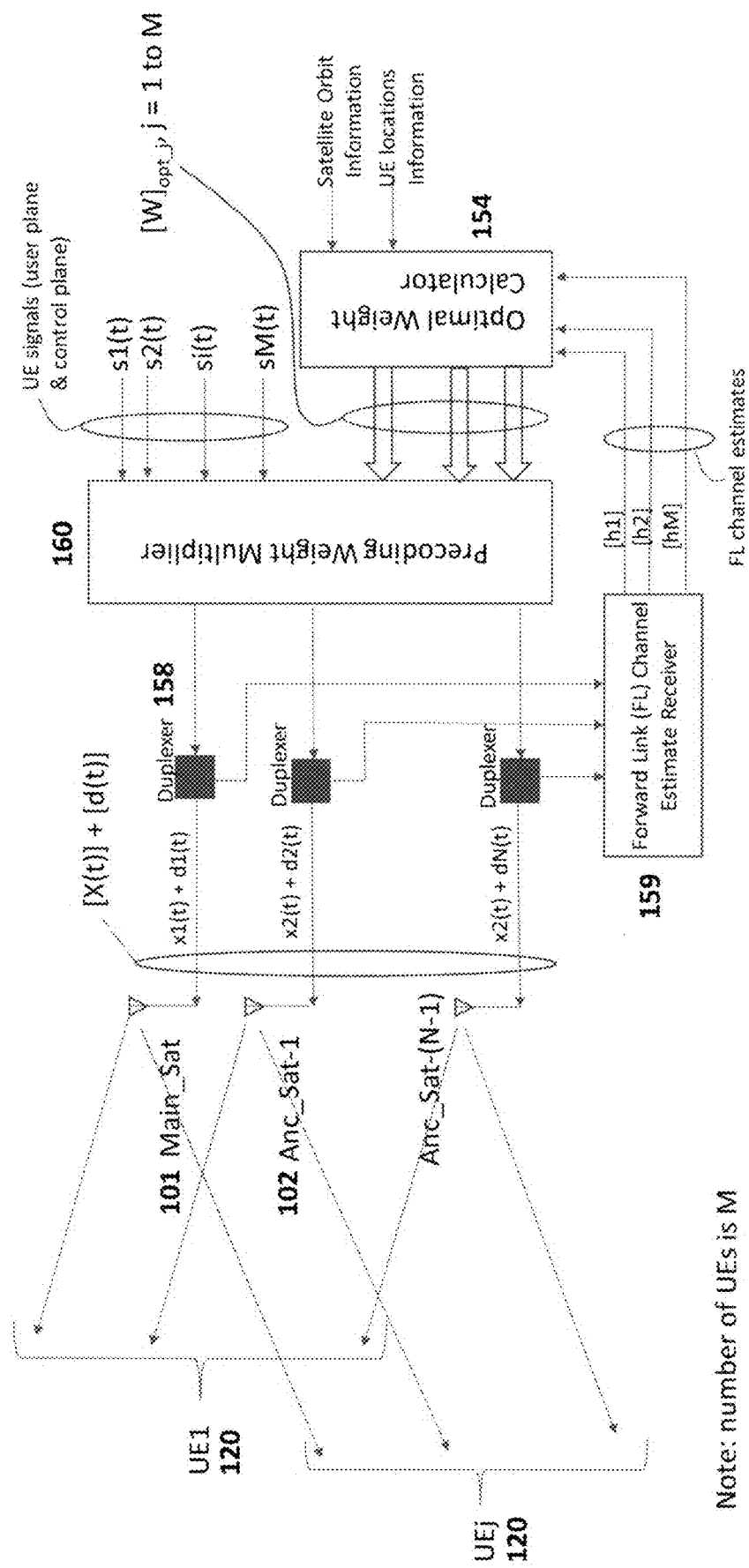
FIG. 11 is a block diagram illustrating a forward link beamforming method according to an embodiment.

A block diagram showing an implementation of forward link beamforming, based on the concepts explained above, is provided in FIG. 11. As illustrated in FIG. 11, processing may be performed with a plurality of duplexers 158 (one each per satellite), a forward link channel estimate receiver 159, a processing weight multiplexer 160 and an optimal weight calculator 154.

As described above, M periodic time series of channel state vectors are received from the M UEs 120 on the uplink. These channel state vectors are collected in the Forward Link (FL) Channel Estimated Receiver. Channel State vectors received over $T_{block}$ seconds are collected to form the channel state matrix, $[H]_I$. The latter is fed to the Optimal Weight Calculator, which transforms $[H]_I$ to a predicted matrix $[H]_p$ using a suitable algorithm discussed below. The matrix $[H]_p$ is used to calculate the optimal weight, $[W]_{opt}$, also referred to as the "precoding weight".

The Precoding Weight Multiplier forms the downlink array vector, [X(t)], as $$[X(t)] = [s(t)]^T[W]_{opt} + [d(t)] \quad (10)$$

Where, [s(t)] is a vector (column matrix) of UE signals carrying user plane and control plane data, as per the chosen service link protocol. [s(t)] is represented as, $$[s(t)] = [s1(t), s2(t), \ldots sM(t)]^T \quad (11)$$

Channel State Prediction

As explained above, forward-time prediction of the channel state vector corresponding to a UE 120 is an advantageous feature of embodiments of the system and method. The prediction is based on leveraging the low multipath contribution in a satellite channel and knowledge of the satellite cluster's location and velocity within finite error bounds. As the environmental model's parameters have a certain amount of uncertainty, or additive noise, statistical prediction methods such as Kalman filters may be well suited to the problem. Other conventional methods of statistical decision theory may also be applied.

The following references disclose various features of conventional systems and method for satellite communication and are hereby incorporated by reference in their entirety.

[1]. Mike Dano, "The new space race: Connecting your phone to a satellite", https://www.lightreading.com/services/the-new-space-race-connecting-your-phone-to-a-satellite/d/d-id/758106,

[2] Inigo del Portillo, et. al, "On Scalability of Fractionated Satellite Network Architectures", 2015 IEEE Aerospace Conference, 10.1109/AERO.2015.7119143,

[3] U.S. Pat. No. 10,523,313, Speidel, et al., "Method and apparatus for handling communications between spacecraft operating in an orbital environment and terrestrial telecommunications devices that use terrestrial base station communications",

[4] U.S. Pat. No. 9,973,266, Avellan, et al., "System and method for high throughput fractionated satellites (HTFS) for direct connectivity to and from end user devices and terminals using flight formations of small or very small satellites",

[5] Dunmin Zheng and Santanu Dutta, "Systems and Methods of Adaptive Beamforming for Mobile Satellite Systems Based on User Location/Waveform", Sep. 23, 2019, Proceedings of IEEE Fall 2019 VTC.

[6] Monzingo, R. A. et al. Introduction to Adaptive Arrays, 2nd Edition, Indian Reprint, 2012, Yes Dee Publishing Pvt Ltd, ISBN: 978-93-80381-28-2

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of communication using a fractionated satellite comprising a main satellite and a plurality of ancillary satellites, the method comprising:
   sending communications from the main satellite through a satellite feederlink antenna to a gateway on the ground,
   wherein the gateway comprises a gateway feederlink antenna,
   wherein gain patterns on the satellite feederlink antenna and the gateway feederlink antenna have peak gains that are mutually, substantially aligned, and
   wherein mutual alignment of the peak gains by open loop beamforming using information about the locations of the fractionated satellite and the gateway.

2. A method of communication using a fractionated satellite comprising a main satellite and a plurality of ancillary satellites, the method comprising:
   sending communications from the main satellite through a satellite feederlink antenna to a gateway on the ground,
   wherein the gateway comprises a gateway feederlink antenna,
   wherein gain patterns on the satellite feederlink antenna and the gateway feederlink antenna have peak gains that are mutually, substantially aligned, and
   wherein the gateway simultaneously tracking multiple fractionated satellites, using at least one of spatial multiplexing based on the beam pattern of the gateway antenna or different frequencies in the feeder link and different polarizations in the feeder link.

* * * * *